US006807669B2

United States Patent
Yanase (10) Patent No.: US 6,807,669 B2
(45) Date of Patent: Oct. 19, 2004

(54) DEVICE FOR ACCOMMODATING CARTRIDGE STORAGE DEVICE AND DISK RECORDING OR PLAYBACK APPARATUS (75) Inventor: Yasuo Yanase, Osaka (JP)

(73) Assignee: Sanyo Electric Co., LTD, Moriguchi (JP)

( * ) Notice: Subject to any disclaimer, the term of this patent is extended or adjusted under 35 U.S.C. 154(b) by 0 days.

(21) Appl. No.: 10/182,738
(22) PCT Filed: Mar. 12, 2001
(86) PCT No.: PCT/JP01/01921
§ 371 (c)(1),
(2), (4) Date: Aug. 14, 2002
(87) PCT Pub. No.: WO01/69599

PCT Pub. Date: Sep. 20, 2001

(65) Prior Publication Data

US 2003/0011928 A1 Jan. 16, 2003

(30) Foreign Application Priority Data

| Mar. 15, 2000 | (JP) | 2000-071916 |
| Mar. 15, 2000 | (JP) | 2000-071926 |
| Mar. 15, 2000 | (JP) | 2000-071932 |
| Mar. 16, 2000 | (JP) | 2000-073220 |
| Mar. 16, 2000 | (JP) | 2000-073228 |

(51) Int. Cl.[7] .............................................. G11B 33/02
(52) U.S. Cl. ..................................................... 720/647
(58) Field of Search ............................. 369/77.2, 77.1, 369/75.1; 360/99.01, 99.02, 99.06; 361/686

(56) References Cited

U.S. PATENT DOCUMENTS 4,530,081 A * 7/1985 Sakurai et al. .............. 369/75.2
4,686,594 A * 8/1987 Kurafuji .................. 360/99.02
6,243,346 B1 * 6/2001 Furukawa et al. ......... 369/75.1
6,377,451 B1 * 4/2002 Furuya ...................... 361/686

FOREIGN PATENT DOCUMENTS

| JP | 1-59953 | 4/1989 |
| JP | 5-205379 | 8/1993 |
| JP | 6-282977 | 10/1994 |
| JP | 11-40954 | 2/1999 |
| JP | 2000-67501 | 3/2000 |

OTHER PUBLICATIONS

Notification from the International Bureau (Form PCT/IB/338).
Translation of the International preliminary Examination Report.

* cited by examiner

Primary Examiner—Tianjie Chen
(74) Attorney, Agent, or Firm—Armstrong, Kratz Quintos, Hanson & Brooks, LLP (57) ABSTRACT A device for accommodating cartridge, wherein a holder allowing a cartridge to be inserted therein is pivotally supported on a chassis with the holder being biased in a closing direction, an upper door is pivotally supported at the free end portion of the holder, a first inclined surface coming in contact with the inserted cartridge and kickout piece coming in contact with the chassis when the holder rises are provided on the upper door, the upper door is biased by a spring in such a direction that a contact face closes the opening of the holder, and the upper door moves between a door opening position in which the cartridge pushes the contact face when the cartridge is inserted so as to expose the opening of the holder and the kickout piece pushes the chassis so as to lift the holder against the biasing force of a spring and a door closing position in which, as the cartridge is further inserted, the cartridge returns in such a direction that the contact face closes the opening after coming out of the contact face so as to permit descent of the holder.

5 Claims, 13 Drawing Sheets

200
DEVICE FOR ACCOMMODATING CARTRIDGE STORAGE DEVICE AND DISK RECORDING OR PLAYBACK APPARATUS

TECHNICAL FIELD

The present invention relates to a device for accommodating a cartridge having enclosed therein a disk serving as a recording medium, and more particularly to a disk recording or playback apparatus.

BACKGROUND ART

Figure 16:
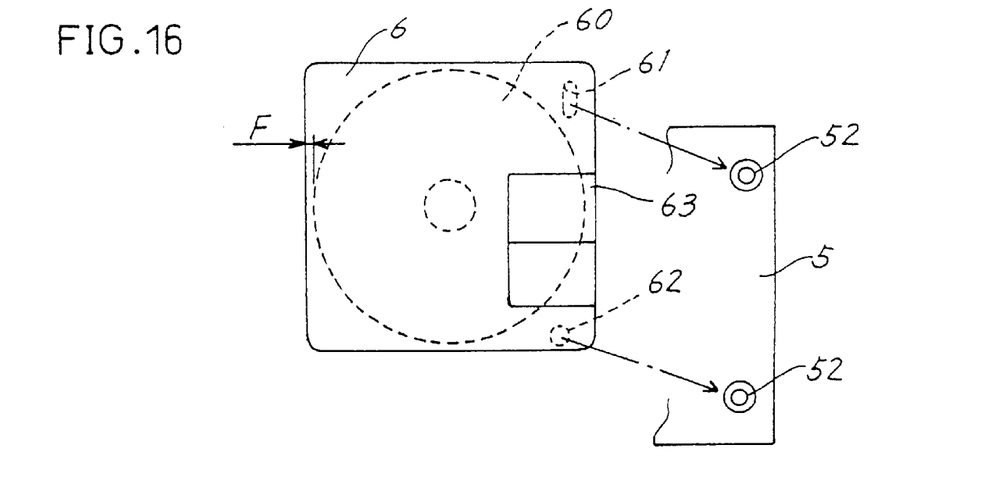
FIG. 16 is a plan view of the cartridge.

FIG. 16 shows a cartridge 6 already proposed for enclosing therein a disk 60 serving as a recording medium. The cartridge 6 is provided on its upper wall with a slidable shutter 63, which partly exposes the disk 60 when opened. Positioning bores 61, 62 are formed in the lower wall of the cartridge 6.

Figure 17:
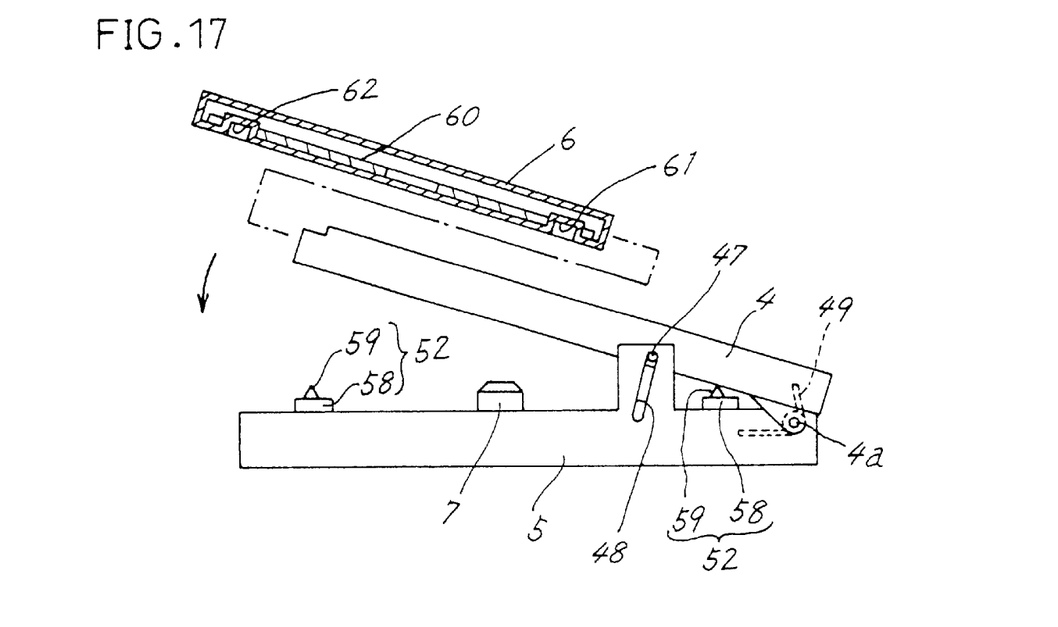
FIG. 17 is a side elevation of a conventional disk recording or playback apparatus.

FIG. 17 is a side elevation of an apparatus for recording signals on or reproducing signals from the disk 60 serving as a recording medium. In the following description, the direction in which the cartridge is inserted into the apparatus will be referred to as "front," and the direction in which it is ejected as "rear."

A holder 4 for placing the cartridge 6 therein has its base end pivoted as at 4a to one end of a chassis 5 having a turntable 7 mounted thereon. Provided between the holder 4 and the chassis 5 is a latch mechanism (not shown) for holding the holder 4 closed. Arranged at each of the front and rear ends of the chassis 5 are positioning pins 52, 52 fittable into the positioning bores 61, 62 of the cartridge 6. Each of the positioning pins 52 comprises a solid cylindrical prop 58 for supporting the bottom of the cartridge 6, and a conical guide projection 59 projecting upward from the top of the prop 58. The peripheral wall portions defining the positioning bores 61, 62 of the cartridge 6 descend while being guide by the respective projections 59 and rest on the tops of the props 58.

The holder 4 has an open free end, through which the cartridge 6 is inserted. The pivot 4a of the holder 4 has a torsion spring 49 fitted therearound for biasing the holder 4 upward. A rod 47 projecting from a side wall of the holder 4 is engaged in an upper end of a circular-arc slit 48 formed in a side wall of the chassis 5 to prevent the holder 4 from rising to a higher position.

When signals are to be recorded or reproduced, the cartridge 6 is first manually inserted into the holder 4 in a raised position. The positioning bores 61, 62 of the cartridge 6 are opposed to the positioning pins 52, 52. The holder 4 is then pivotally moved down by hand. The positioning bores 61, 62 are fitted around the guide projections 59 of the positioning pins 52, 52, the disk 60 is placed on the turntable 7, and signals are recorded or reproduced.

When signals are to be recorded or reproduced by positioning the cartridge 6 as opposed to the turntable 7, the above apparatus requires insertion of the cartridge 6 into the holder 7 and pushing of the holder 4 downward, namely, two manual movements. The present applicant has conceived the idea of making the apparatus more convenient to use by reducing this procedure to a single manual movement.

An object of the present invention is to position the cartridge as opposed to the turntable by a single manual movement.

DISCLOSURE OF THE INVENTION

A holder 4 has a spring attached to a base end thereof for biasing the holder 4 in a closing direction and a door 1 pivoted as at 1a to a free end thereof. The door 1 has a contact face positioned at a cartridge ejecting side of the pivot 1a and inclined with respect to the direction of insertion of a cartridge, and a kickout piece 12 positioned at a cartridge inserting side of the pivot 1a and movable into contact with a chassis 5 when the holder 4 is raised. The door 1 is biased by a spring in a direction for the contact face to close an opening of the holder 4. The door 1 is movable between an opened position in which the contact face is pushed by the cartridge 6 to expose the opening of the holder 4 when the cartridge 6 is inserted, and the kickout piece 12 pushes the chassis 5 to lift the holder 4 against the biasing force of the spring and a closed position in which the contact face returns in a direction to close the opening after the contact face is released from the cartridge 6 as the cartridge 6 is further inserted to permit descent of the holder 4.

BEST MODE OF CARRYING OUT THE INVENTION (Brief Description of the Entire Apparatus)

An embodiment of the invention will be described below in detail with reference to the drawings.

Figure 1:
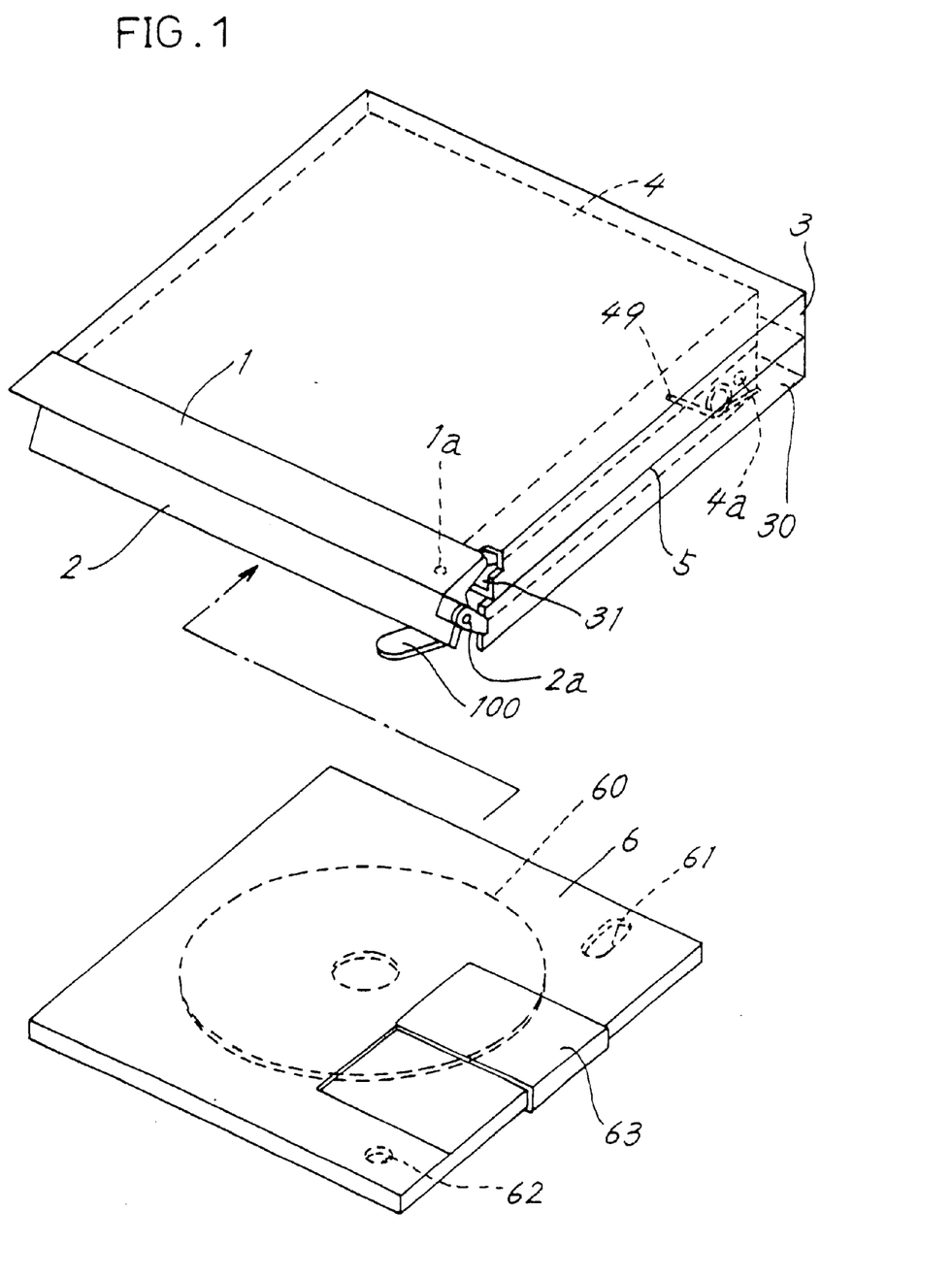
FIG. 1 is a perspective view of a disk recording or playback apparatus.

FIG. 1 is a perspective view of a disk recording or playback apparatus. As in the prior art, a disk 60 is enclosed in a cartridge 6, which has positioning bores 61, 62 which are open in the lower surface of the cartridge. The front bore 61 is a slot elongated forward or rearward. The rear bore 62 is circular.

The apparatus is generally in the form of a rectangular parallelepiped and comprises a lower case 30 and an upper case 3 attached thereto openably. The apparatus of this type is termed the slot-in type and is often carried as placed in a pocket of the user's jacket, so that the apparatus has a generally rectangular parallelepipedal shape and is made easy to place into the pocket.

A holder 4 has an open rear end and is provided in and attached to the upper case 3 shown in FIG. 1, and a chassis 5 is provided in and attached to the lower case 30. The holder 4 and the chassis 5 are fixed at their front ends to the upper case 3 and the lower case 30, respectively. The holder 4 is pivoted to the front end of the chassis 5 as at 4a. The holder 4 is biased toward a closing direction by a torsion spring 49 provided in the vicinity of the pivot 4a.

A space is provided between the right side wall of the holder 4 and the upper case 3, and between the right side wall of the chassis 5 and the lower case 30. A holder lock mechanism and unlocking mechanism are provided in the respective spaces as will be described later. The upper case 3 has an open rear end, and is inwardly bent at a right side wall rear end portion to provide a horizontal plate 31.

Figure 11A:
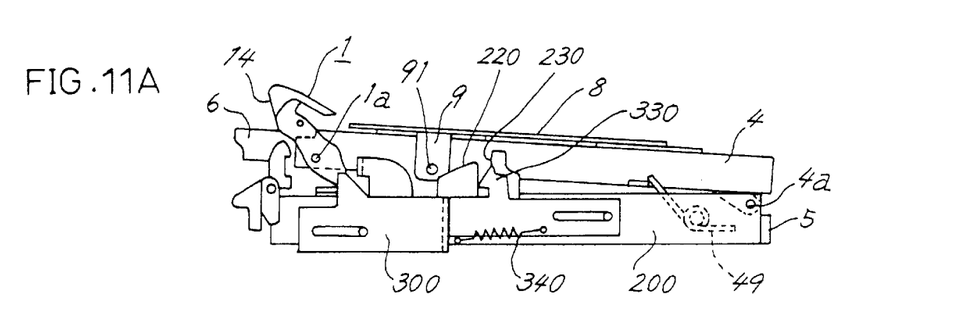
FIGS. 11A, 11B and 11C are side elevations showing the holder while it is being opened.
Figure 11B:
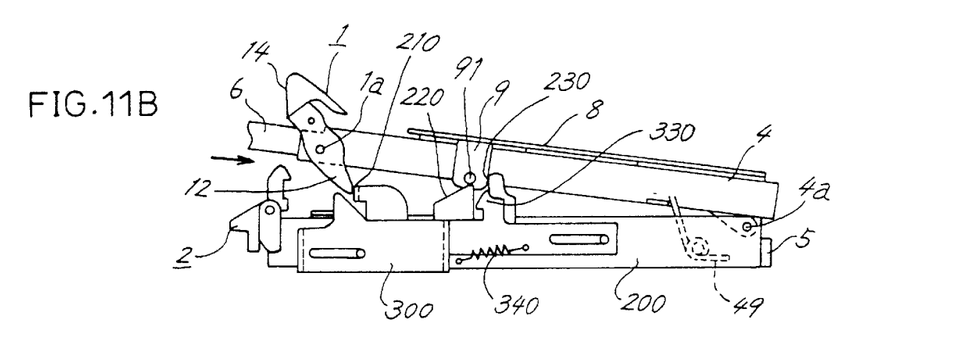
Figure 11C:
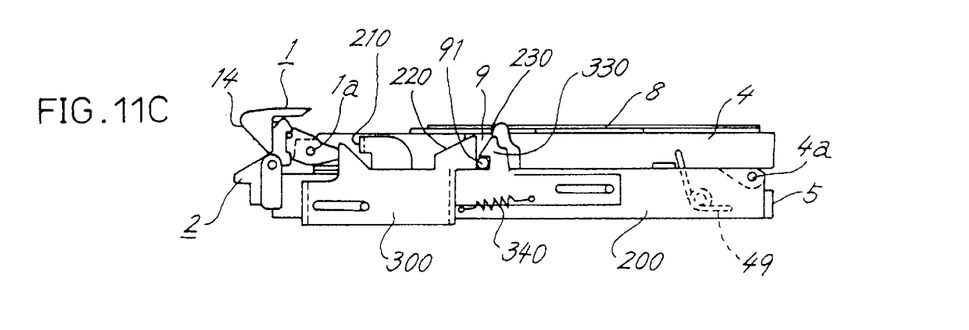
Figure 12:
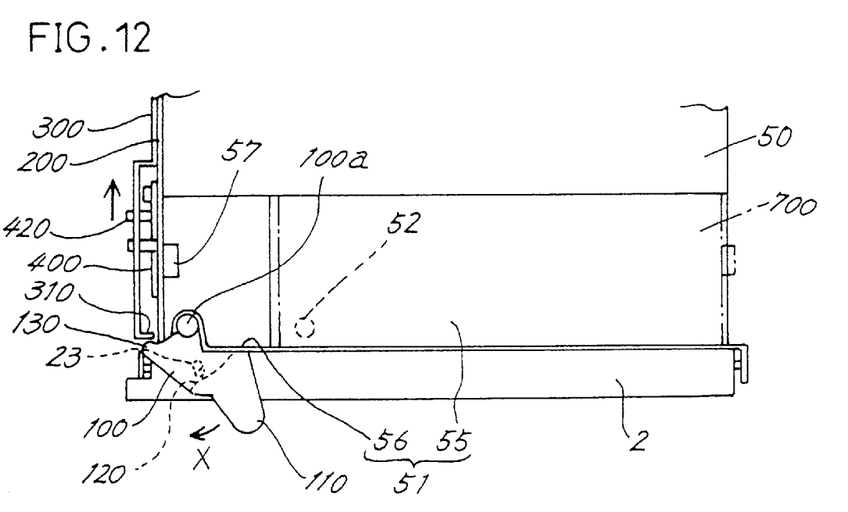
FIG. 12 is a rear view of a frame.

The apparatus according to the present embodiment is characterized by a cartridge inserting and ejecting movements as will be described below briefly. When the cartridge is inserted, an upper door 1 of the upper case 1 is pivotally moved to slightly open the holder 4 as shown in FIG. 8C. When the cartridge 6 is further inserted, the holder 4 is opened in two steps, i.e., to a first and a second opened position, as shown in FIGS. 11A, 11B and then closed as seen in FIG. 11C. When the cartridge is to be ejected, an ejecting lever 100 shown in FIG. 12 is pivotally moved to forcibly raise the holder 4, and the cartridge 6 is taken out of the holder 4.

(Brief Description of Cartridge Inserting-Ejecting Mechanism)

The upper door 1 which is laterally elongated for covering the rear-end opening of the holder 4 shown in FIG. 1 is pivoted to the free end of the holder 4 as at 1a. The pivot 1a is disposed inwardly of the door 1. A lower door 2 opposed to the upper door 1 is pivoted as at 2a to the chassis 5. The two doors 1, 2 are made from a material (such as synthetic resin) having a smooth surface and suitable rigidity so as not to deface the cartridge 6 when an end of the cartridge 6 comes into contact therewith, and are biased toward a closing direction by respective torsion springs (not shown) fitted around the pivots 1a, 2a.

Figure 2A:
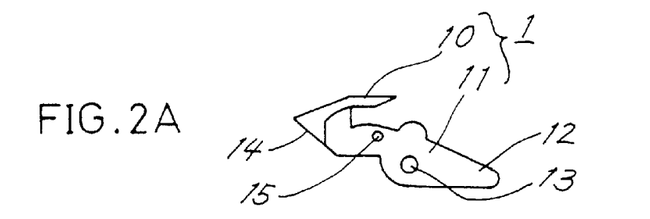
FIG. 2A is a side elevation of an upper door.
Figure 2B:
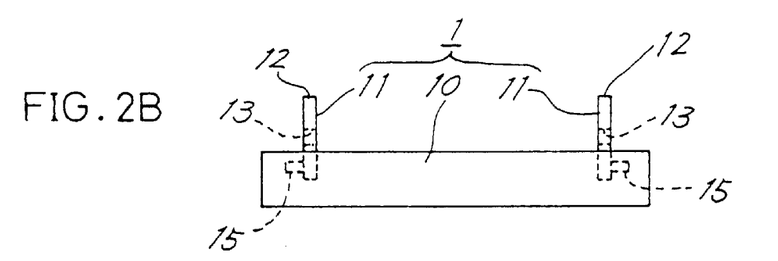
FIG. 2B is a plan view of the upper door.
Figure 3A:
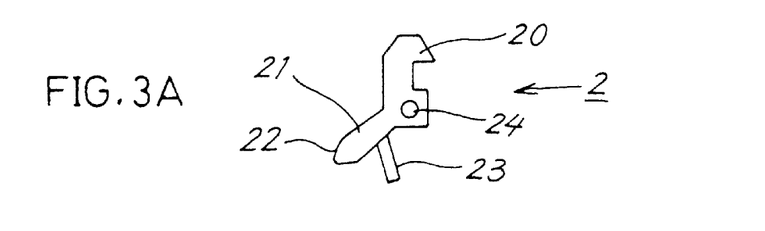
FIG. 3A is a side elevation of a lower door.
Figure 3B:
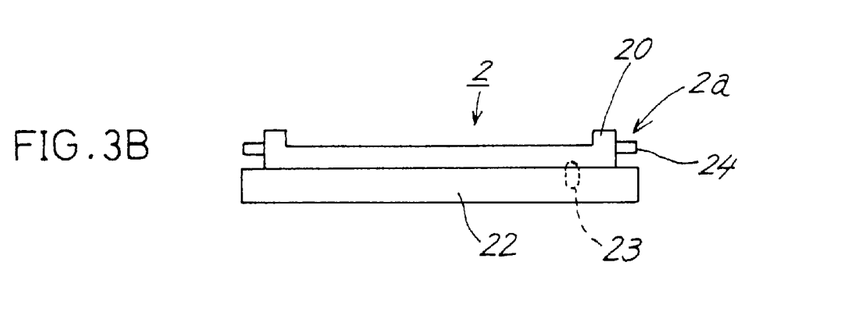
FIG. 3B is a plan view of the lower door.

FIG. 2A is a side elevation of the upper door 1, FIG. 2B is a plan view of the upper door 1, FIG. 3A is a side elevation of the lower door 2, and FIG. 3B is a plan view of the lower door 2. The upper door 1 comprises an eaves portion 10 provided at opposite sides thereof with plate pieces 11, 11 integrally therewith. Each plate piece 11 has a hole 13 providing the pivot on the holder 4. The plate piece 11 extends forward beyond the hole 13 and is made into a kickout piece 12. The eaves portion 10 has a lower surface providing a fist slope 14 which is inclined downward along the cartridge inserting direction as will be described later. The plate piece 11 has a latch pin 15 projecting outward as positioned between the hole 13 and the eaves portion 10. The hole 13 is positioned at a lower level than the lower end of the slope 14.

The lower door 2 comprises a lock pawl 20 engageable with the latch pin 15, a projection 21 extending obliquely downward from the lower end of the lock pawl 20 along the cartridge ejecting direction, and a cam follower 23 extending downward from the vicinity of the base end of the projection 21, these portions 20, 21 and 23 being formed integrally. The projection 21 has a rear end providing a second slope 22. A pin 24 serving as the pivot 2a on the chassis 5 projects outward from the lower end of the lock pawl 20.

(Detailed Description of the Holder and Chassis)

Figure 4:
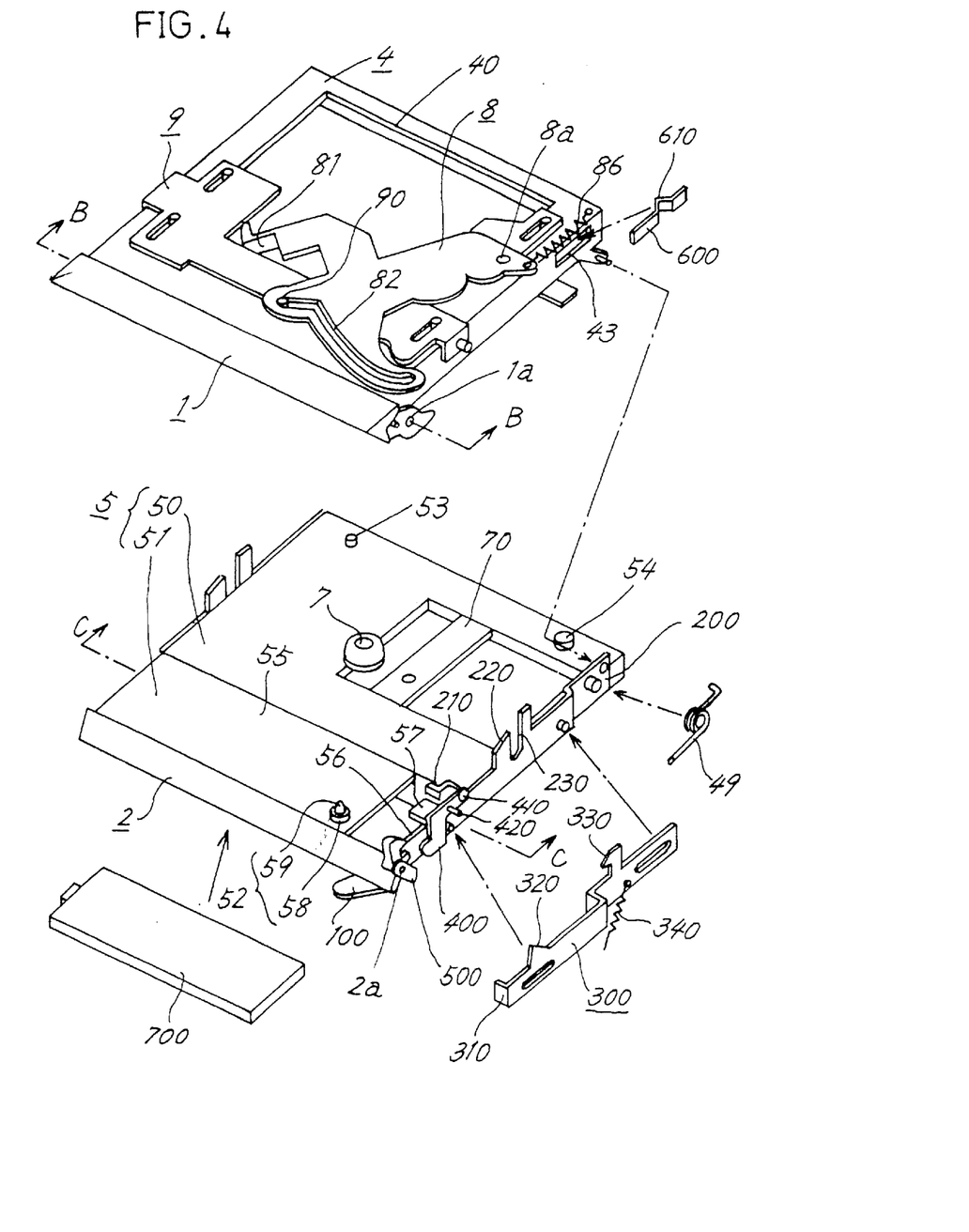
FIG. 4 is an exploded perspective view of a holder and a chassis.

FIG. 4 is an exploded perspective view of the holder 4 and the chassis 5. The present apparatus is provided with a cell 700 in the form of a plate, more specifically a Ni—Cd cell. The chassis 5 comprises main chassis body 50 made from a synthetic resin, and a cell holder 51 made from a metal plate by bending and disposed in the rear of the body 50. The cell holder 51 has a frame 56 projecting from the right side of a support plate 55 which is positioned in substantially the same plane as the upper surface of the main chassis body 50 (see FIG. 12). The cell 700 is placed below the support plate 55 and inside the frame 56 and held between a rear wall of the frame 56 and a rear wall of the chassis body 50.

A turntable 7 is mounted on the main chassis body 50, and a pickup 70 for projecting a beam on the disk is movable toward and away from the turntable 7. The front end of the chassis body 50 is provided at its opposite sides with first and second bearing protrusions 53, 54 each in the form of a rod for supporting the front end of the cartridge 6. The support plate 55 has provided thereon a positioning pin 52 fittable into the positioning bore 62 in the rear end of the cartridge 6. The present embodiment has only one positioning pin 52 for supporting the rear end of the cartridge 6.

The first and second bearing protrusions 53, 54 and a prop 58 of the positioning pin 52 support the lower wall of the cartridge 6, and the turntable 7 supports the disk 60 within the cartridge 6. Accordingly, the turntable 7 is higher than the first and second bearing protrusions 53, 54 and the prop 58.

If both the main chassis body 50 and the cell holder 51 are made from a metal plate, the chassis 5 becomes heavier in its entirety. Further the drawing work needed for providing the first and second bearing protrusions 53, 54 gives strain to the main chassis body 50. Although it appears possible to outsert the main chassis body 50 to provide the first and second bearing protrusions 53, 54, this entails an increased cost.

On the other hand, if both the main chassis body 50 and the cell holder 51 are made from synthetic resin, the chassis 5 becomes lightweight in its entirety, but the cell holder 51 diminishes in strength. The cell holder 51 for holding the cell 700 readily deforms when subjected to an impact from outside, permitting the cell 700 to fall off the holder. The cell holder 51 is therefore made from a metal plate, and the main chassis body 50 from synthetic resin, to give the cell holder 51 increased rigidity and the chassis 5a reduced weight in its entirety.

A support bracket 200 extending forward or rearward is provided alongside both the side walls of the main chassis body 50 and the cell holder 51 of FIG. 4, and a slide plate 300 slidable forward or rearward is attached to the support bracket 200.

The support bracket 200 has a vertical plate 210 positioned at a rear end portion thereof and inwardly bent, a lift slope 220 positioned to the front of the vertical plate 210 and slanting forwardly upward, and a guide groove 230 positioned to the front of the lift slope 220 and recessed downward.

The slide plate 300 is biased rearward by a spring 340 and has an inwardly bent rear end portion providing a driven plate 310. The slide plate 300 is provided, to the rear of the lengthwise midportion thereof with, a slanting edge 320 and has a hook 330 positioned in front of the slanting edge 320 and projecting upward for providing a holder lock mechanism. As will be described later, the slide plate 300 is manipulated when the cartridge 6 is to be ejected.

A push-up lever 400 is interposed between the slide plate 300 and the support bracket 200. The push-up lever 400 has a base end supported by a pivot 410 on the support bracket 200. A torsion spring (not shown) is fitted around the pivot 410 for biasing the lever 400 downward, and a pin 420 projecting from the push-up lever 400 is in contact with the slating edge 320 of the slide plate 300. As will be described later, the push-up lever 400 pushes up the horizontal plate 31 of the upper case 3 when the cartridge 6 is ejected.

The pin 24 (see FIG. 3B) on the lower door 2 is fitted in a hole (not shown) formed in a small support piece 500 projecting from the side wall of the chassis 5 to provide the pivot 2a for the lower door 2.

The chassis 5 is provided on the lower surface thereof with the ejecting lever 100 pivotally movable in a horizontal plane and adapted to contact the slide plate 300. When the cartridge 6 is to be ejected from the holder 4, the ejecting lever 100 is manually turned as will be described later to push the slide plate 300 forward. Thus, the ejecting lever 100 provides a holder unlocking mechanism.

A slide piece 9 made from a metal plate by bending is provided on the upper surface of the holder 4 forwardly or rearwardly movably and is provided thereon with a push lever 8 having a base end pivoted to the holder 4 as at 8a.

Figure 5:
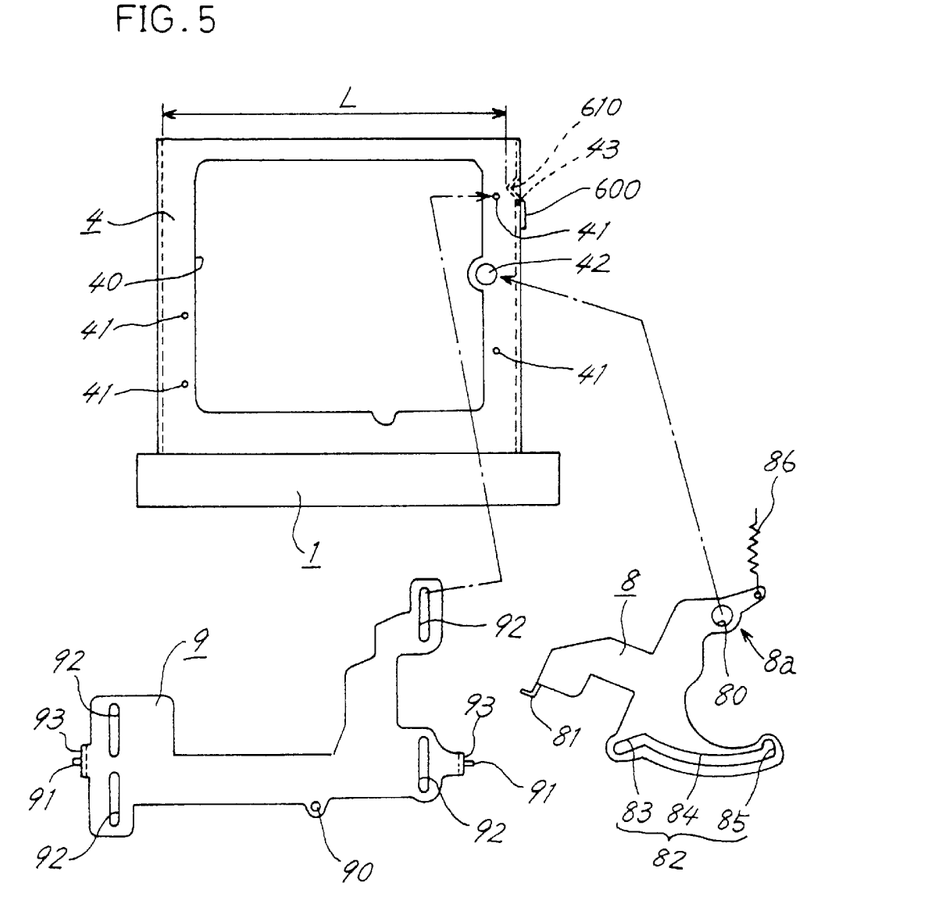
FIG. 5 is an exploded plan view of the holder, a slide piece and a push lever.

FIG. 5 is an exploded plan view of the holder 4, slide piece 9 and push lever 8. The holder 4 has an aperture 40 formed in its upper wall, and the peripheral portion defining the aperture has four support pins 41, 41, 41, 41. The slide piece 9 has four slits 92, 92, 92, 92 extending forward or rearward for the support pins 41, 41, 41, 41 to fit in respectively, and a fitting pin 90a its rear end.

Lugs 93, 93 extend downward from opposite sides of the slide piece 9, with a guide pin 91 projecting outward from each lug 93.

A retaining pin 42 is mounted on the holder 4 between the support pins 41, 41 on the right side and fitted in a hole 80 formed in one end of the push lever 8, providing the pivot 8a for the lever 8. The push lever 8 is biased counterclockwise by a tension spring 86 extending between the lever 8 and the holder 4.

The push lever 8 has a free end bent downward to provide a pushable piece 81, which extends through the aperture 40 of the holder 4 to project into the path of movement of the cartridge 6. The push lever 8 further has a cam slot 82 for the fitting pin 90 on the holder 4 to fit in. The cam slot 82 comprises a first slanting slit 83 inclined with respect to the cartridge inserting direction, a circular-are slit 84 centered about the center of the hole 80, and a second slanting slit 85 extending from one end of the slit 84 toward the hole 80.

The right side wall of the holder 4 has an opening 43, and a plate spring 600 having a bent portion 610 movable into the holder 4 is attached to the holder right side wall at a portion thereof close to an end of the opening 43. The distance L from the bent portion 610 to the left side wall of the holder 4 shown in FIG. 5 is approximately equal to the width of the cartridge 6. A protrusion (not shown) to be in contact with a side wall of the cartridge 6 may be provided on the inner side of the left side wall holder 4.

When inserted into the holder 4, the cartridge 6 is restrained from shaking laterally by being held between the left side wall of the holder 4 and the bent portion 610 of the plate spring 600. Stated more specifically, the rear positioning bore 62 is fitted around the corresponding positioning pin 52 to restrain the inserted cartridge 6 from backlashing forward or rearward, and the front end portion of the holder 4 restrains the cartridge 6 from lateral backlashing.

Figure 7:
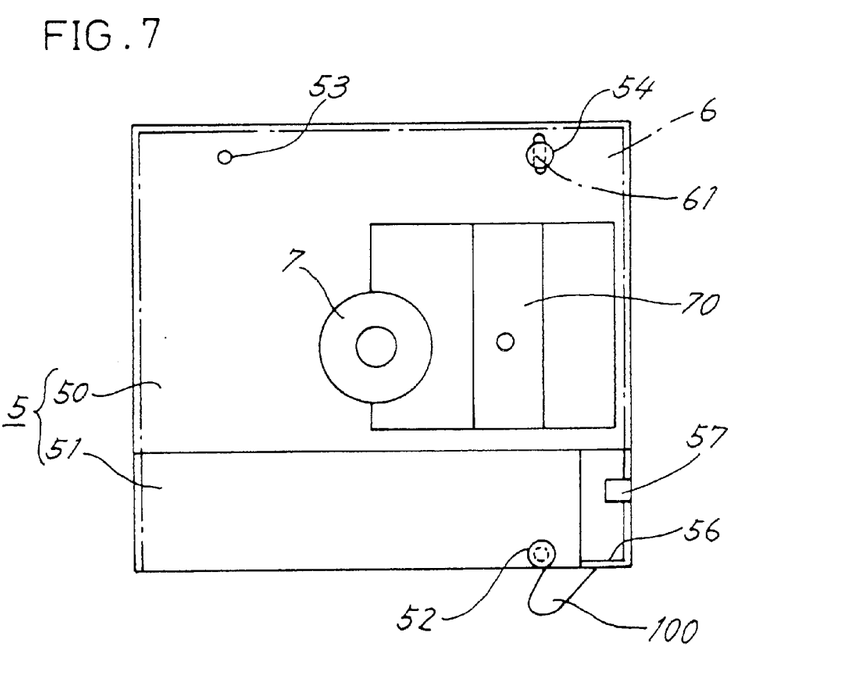
FIG. 7 is a plan view of the chassis and a cartridge.

With reference to FIG. 7, the cartridge 6 has a front portion around the positioning bore 61 and in contact with the second bearing protrusion 54, and a front left portion supported by the first bearing protrusion 53. In this respect, the present apparatus differs from the conventional device wherein the front and rear end portions of the cartridge 6 fit to the two positioning pins 52, 52. This feature reduces the amount to which the holder 4 is opened.

Figure 6:
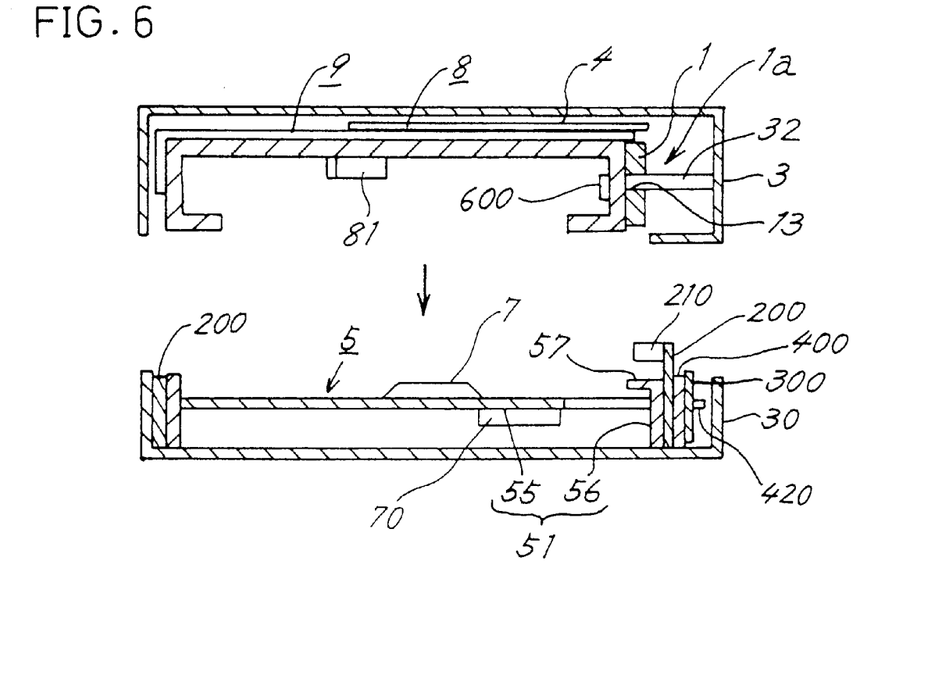
FIG. 6 includes views in section taken along a plane containing the line B—B of FIG. 4 and along a plane containing the line C—C of FIG. 4 and showing the holder and the chassis, respectively.

FIG. 6 is a view showing the holder 4 as covered with the upper case 3 and in section along a plane containing the line B—B in FIG. 4, and the chassis 5 as covered with the lower case 30 and in section along a plane containing the line C—C in FIG. 4. A pin 32 inwardly extends from the right wall of the upper case 3 and has an inner end inserted through the hole 13 in the upper door 1 and fitting into the holder 4, thus providing the pivot 1a for the upper door 1.

Below the upper door 1, a bearing plate 57 projects inward from the frame 56. The kickout piece 12 of the upper door 1 turns in contact with the bearing plate 57 to open the upper case 3 as will be described later. There is an open clearance between the vertical plate 210 and the bearing plate 57, with the kickout piece 12 of the door 1 positioned in this clearance as will be described later.

(Opening Movement of the Doors and Holder)

Figure 8A:
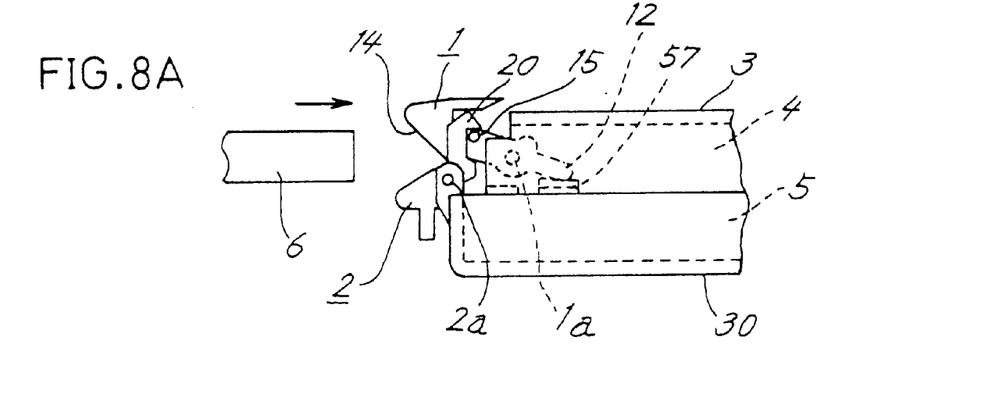
FIGS. 8A, 8B and 8C are side elevations showing the cartridge when it is to be inserted into the holder.
Figure 8B:
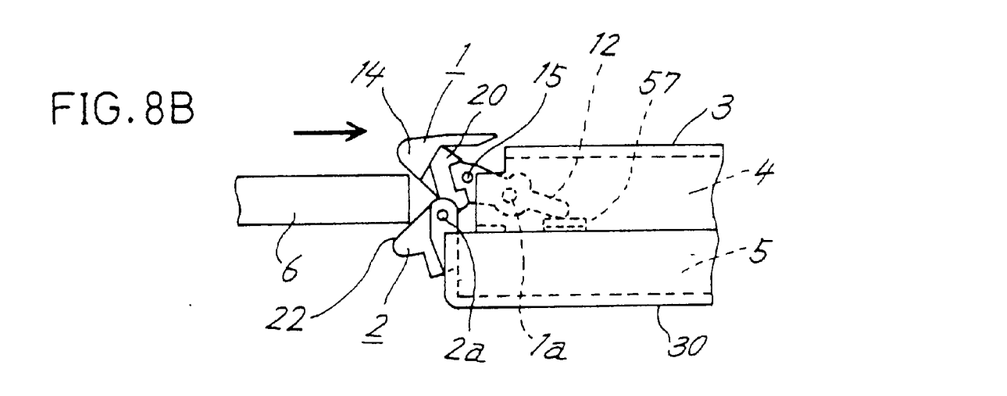
Figure 8C:
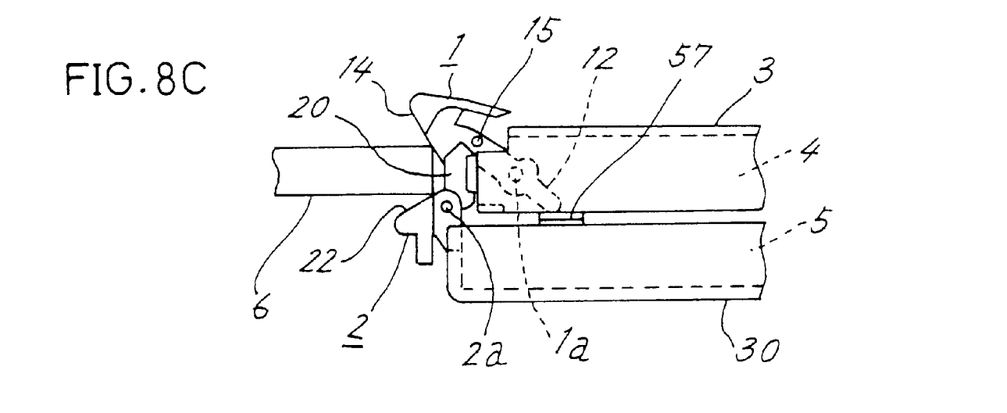

FIGS. 8A, 8B and 8C are side elevations showing the holder 4 in the upper case 3 when the cartridge 6 is about to be inserted thereinto. FIGS. 9A, 9B, 10A and 10B are plan views showing the movement of the slide piece 9 and the push lever 8 during the insertion of the cartridge. The torsion spring 49 is not shown in FIGS. 9A, 9B, 10A and 10B.

With reference to FIG. 8B, when the cartridge is inserted, the upper door 1 is first opened, permitting the advance of the cartridge 6 into the holder 4. The holder 4 and the upper case 3 are then opened to the first opened position. The holder 4 and the upper case 3 are subsequently opened to the second opened position and thereafter closed. The holder 4 is opened in two steps for the reason given later.

Standby State

In a standby state before the insertion of the cartridge 6, the lock pawl 20 of the lower door 2 is in engagement with the latch pin 15 of the upper door 1 as shown in FIG. 8A, preventing the upper door 1 from opening inadvertently. The kickout piece 12 of the upper door 1 is in contact with the bearing plate 57 of the chassis 1.

Figure 9A:
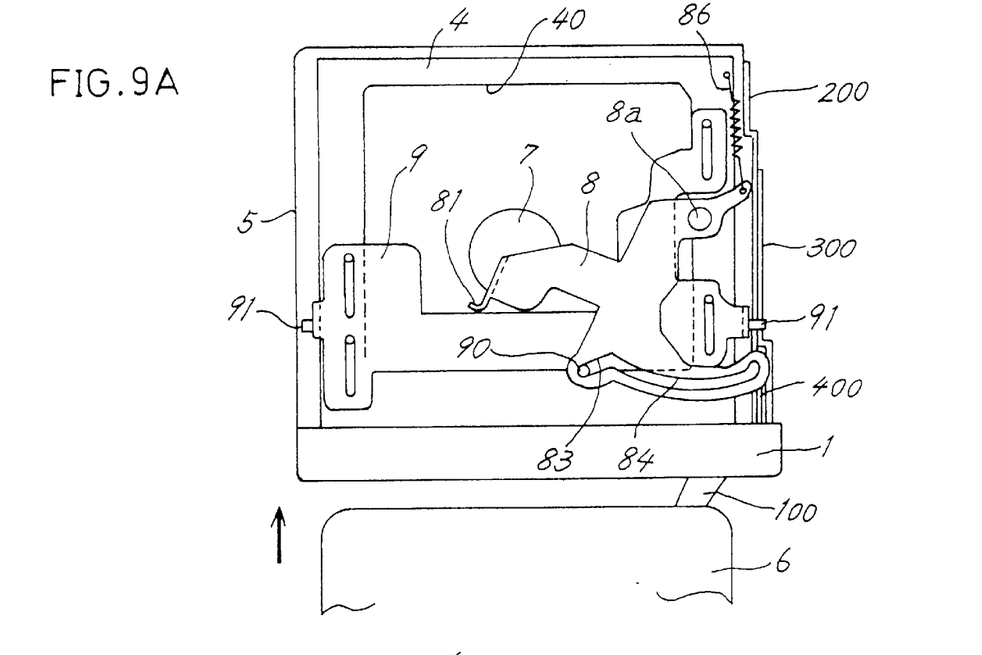
FIGS. 9A and 9B are plan views showing the movement of the slide piece and the push lever when the cartridge is inserted.

With reference to FIG. 9A, the slide piece 9 is in the rearmost position, and the fitting pin 90 on the slide piece 9 is fitted in the left end of the first slanting slit 83. As previously stated, the pushable piece 81 of the push lever 8 projects into the path of movement of the cartridge 6 through the aperture 40 of the holder 4.

Insertion of the Cartridge (First Opened Position of the Holder)

When the holder 4 is inserted into the cartridge 6 as seen in FIG. 8B, the front end of the cartridge 6 initially comes into contact with the second slope 22 of the lower door 2 below the pivot 2a. The lower door 2 is turned counter-clockwise about the pivot 2a against the force of spring, releasing the lock pawl 20 from the latch pin 15. The front end of the cartridge 6 in contact with the second slope 22 rises along this slope, pushing the first slop 14 of the upper door 1.

Since the pivot 1a of the upper door 1 is positioned below the first slope 14, the upper door 1 pivotally moves clockwise about the pivot 1a as shown in FIG. 8C. However, the kickout piece 12 of the upper door 1 is in contact with the bearing plate 57 of the chassis 5 and therefore kicks the plate 57 to thereby open the holder 4. Since the upper door 1 rises with the holder 4, the latch pin 15 moves out of path of pivotal movement of the lock pawl 20. The cartridge 6 is inserted into the holder 4 being opened, moving upward along the second slope 22, so that the lower door 1 is pushed on the second slope 22 at the upper side of the pivot 2a and returned to the original position by the torsion spring around the pivot 2a.

FIGS. 11A, 11B and 11C are side elevations showing how the holder 4 is opened, with the ejecting lever 100, upper case 3 and lower case 30 omitted. FIG. 11A shows the holder 4 as slightly opened from the state shown in the side elevation of FIG. 8C. The upper door 1 is opened, with the lower end of the first slope 14 in contact with the upper surface of the cartridge 6. This position will be termed the "first opened position" of the holder and is also an opened position of the upper door 1.

(Second Opened Position of the Holder)

Figure 9B:
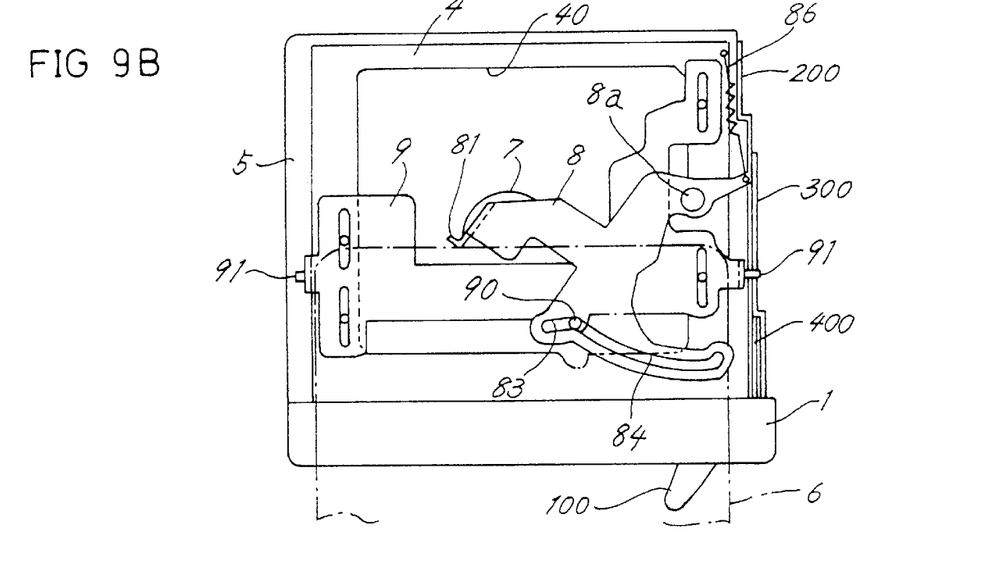

When the cartridge 6 is further inserted into the holder 4, the front end of the cartridge 6 pushes the pushable piece 81 of the push lever 8 as shown in FIG. 9B, rotating the lever 8 clockwise about the pivot 8a against the tension spring 86. The side edge defining the first slanting slit 83 pushes the fitting pin 90 forward to advance the slide piece 9.

As shown in FIG. 11B, the advance of the slide piece 9 moves the guide pin 91 along the lift slope 220 of the support bracket 200, moving the holder 4 upward about the pivot 4a. The end of the kickout piece 12 of the upper door 1 comes into contact with the vertical plate 210 of the support bracket 200, and the upper door 1 further turns clockwise, whereby the lower end of the first slope 14 of the upper door 1 moves out of contact with the upper wall of the cartridge 6. Although the upper door 1 is biased toward the closing direction by the spring, the frictional force due to the force of the spring does not act on the cartridge 6. The holder 1 is opened to a great extent in this position than in the first opened position, and this position will be referred to as the "second opened position" of the holder.

Figure 10A:
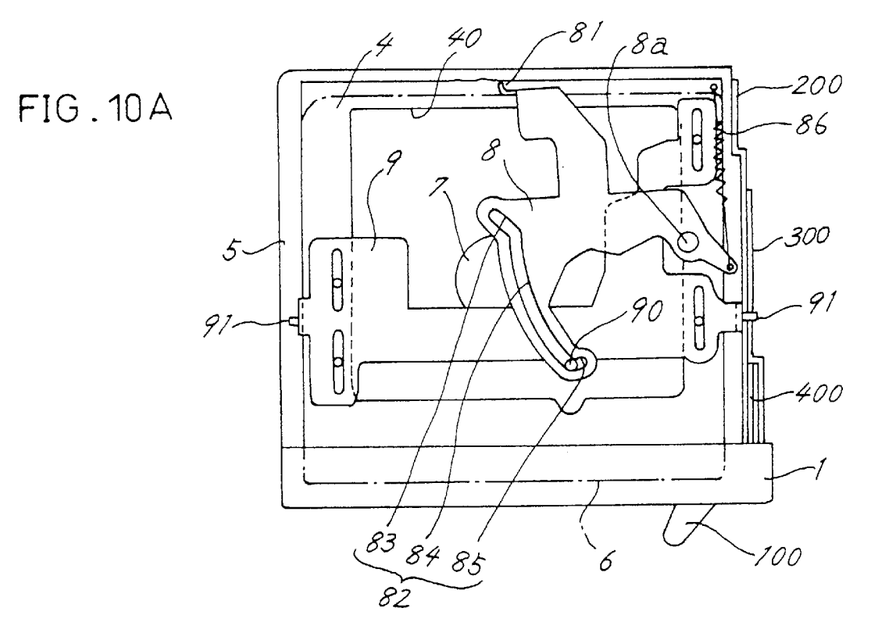
FIGS. 10A and 10B are plan views showing the movement of the slide piece and the push lever when the cartridge is inserted.

When the cartridge 6 is further pushed in from the second opened position, the cartridge 6 rotates the push lever 8 further clockwise as seen in FIG. 10A. With the pin 90 fitting in the circular-arc slit 84, however, the slide piece 9 does not advance despite the rotation of the lever 8, holding the holder 4 in its second opened position.

Figure 10B:
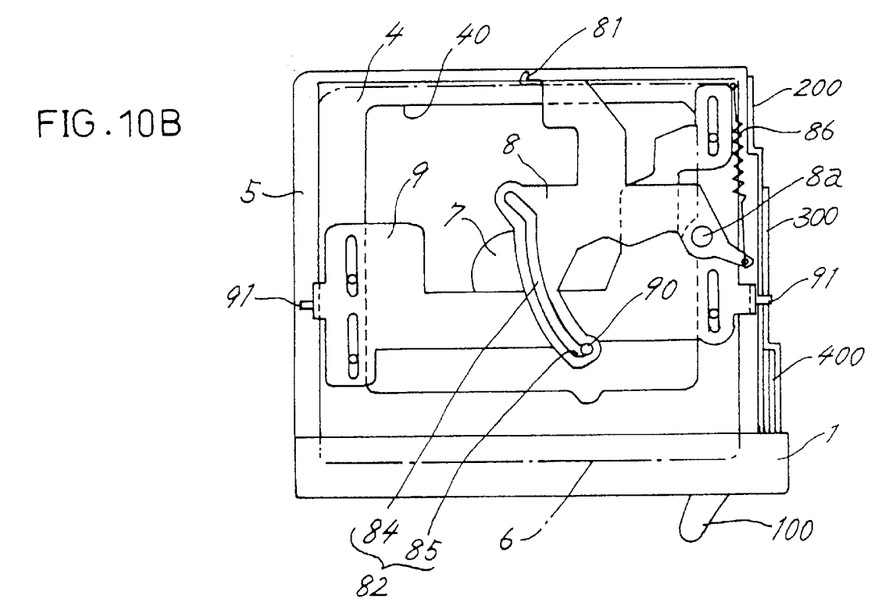

When the cartridge 6 is pushed in to the final position, the pin 90 moves out of the circular-arc slit 84 and fits into the second slanting slit 85 as shown in FIG. 10B. The edge of the slitted portion 85 pushes the pin 90 forward to advance the slide piece 9.

When the slide piece 9 advances after the holder 4 has reached the second opened position, the guide pin 91 of the holder 4 is opposed to the upper opening of the guide groove 230. With the holder 4 biased downward by the torsion spring 49, the guide pin 91 is moved down the groove 230 as shown in FIG. 1C. The guide pin 91 comes into contact with the upper edge of the hook 330, temporarily pushing the slide plate 300 forward, but upon the guide pin 91 moving past the hook 330, the slide plate 300 is returned by the spring 340, causing the hook 330 to engage the guide pin 91. The holder 4 is locked to the chassis 5.

With the descent of the holder 4, the kickout piece 12 of the upper door 1 moves out of contact with the vertical plate 210, permitting the upper door 1 to return to the original position for closing as shown in FIG. 11C. This position will be referred to as a "closed position" of the door. Thus, the upper door pivotally moves between the open position and the closed position.

Signals are recorded or reproduced with the cartridge 6 placed on the turntable 7 as shown in FIG. 10B. Since the guide pin 9 is positioned in the guide groove 230 as shown in FIG. 11C, restraining the holder 4 from backlashing forward or rearward, the push lever 8 remains immovable in engagement with the holder 4.

(Reason for Opening the Holder in Two Steps)

The holder 4 is opened in two steps, i.e., to the first and second opened positions, for the following reason.

Figure 15A:
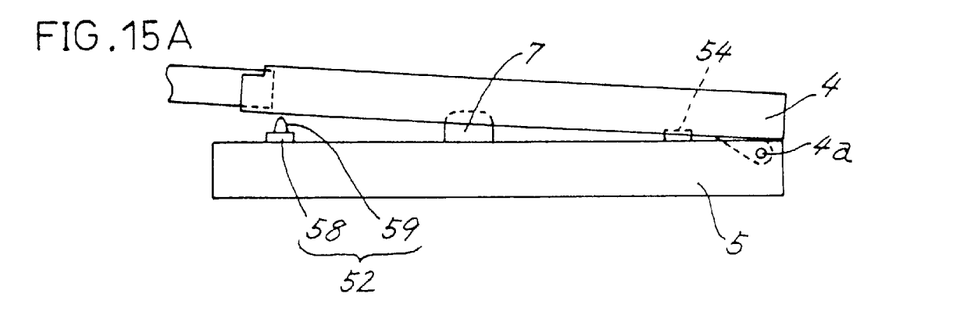
FIGS. 15A and 15B are simplified side elevations showing the holder as opened, FIG. 15A showing a first opened position, FIG. 15B showing a second opened position.
Figure 15B:
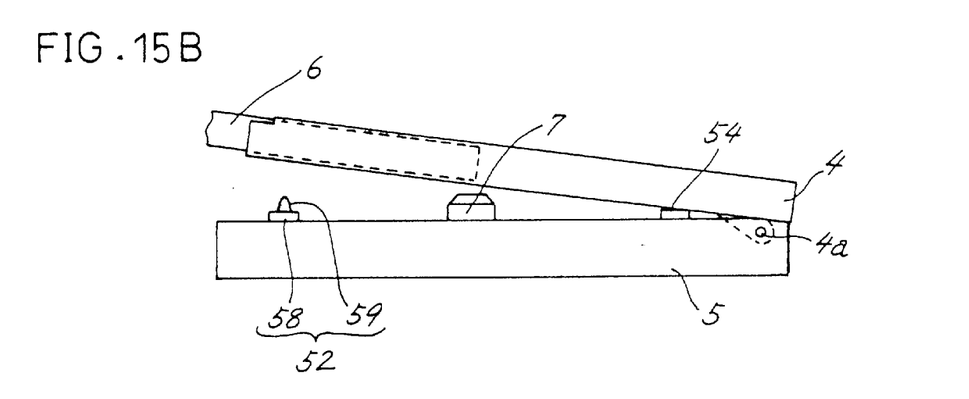

FIGS. 15A and 15B are simplified side elevations showing the holder 4 in the respective opened positions, FIG. 15A showing the first opened position, FIG. 15B showing the second opened position.

When opened to the first opened position, the holder 4 is opened until the lower wall of the cartridge 6 is moved up beyond the positioning pin 52 at the rear end of the chassis 5. The turntable 7 has a greater height than the prop 58 of the positioning pin 52 as previously stated, and even if inserted into the holder 4 in the first opened position, the cartridge 6 fails to move over the turntable 7.

When the holder 4 is opened to the second opened position, the lower wall of the cartridge 6 is positioned over the turntable 7. When the cartridge 6 so positioned is pushed in, the lower wall of front end of the cartridge 6 is opposed to the second bearing protrusion 54.

Thus the holder 4 is slightly opened when the cartridge 6 is initially inserted and is thereafter opened greatly. If the holder 4 is opened to the second opened position in the initial stage of opening of the cartridge 6, the period of time the holder 4 is open greatly is long, consequently increasing the likelihood of exposing the chassis 5 to dust or like extraneous matter. Since signals are recorded on the disk 60 within the cartridge at a high density, deposition of dust or the like thereon is likely to entail an error in operation.

Since the duration during which the holder 4 is opened greatly is shortened according to the present embodiment, this diminishes the likelihood of exposing the chassis 5 to dust or like extraneous matter to thereby obviates an erroneous operation due to ingress of dust or the like.

(Technical Advantage in Inserting the Cartridge)

According to the present embodiment, the cartridge 6 is prevented from backlashing laterally by the holder 4, so that the second bearing protrusion 54 disposed on the chassis 5 at the front end thereof is provided with no guide projection 59 (see FIG. 17). Accordingly, the second bearing protrusion 54 has a smaller height than the positioning pin 52.

With the prior art, the holder 4 needs to be opened to such an extent that the cartridge 6 is moved over the positioning pin 52 at the front end of the chassis 5 as shown in FIG. 17, whereas according to the present embodiment, the holder 4 needs to be opened to an extent permitting the cartridge 6 to move over the second bearing protrusion 54, such that the amount of opening is smaller. This also serves to preclude ingress of dust or the like. The apparatus of the type described will be used in a narrow space as in the pocket of a coat or jacket, so that the smaller amount of opening of the holder 4 renders the apparatus more convenient to use.

A clearance F is provided between the side wall of the cartridge and the outer periphery of the disk 60 as shown in FIG. 16, whereas there is little or no clearance between opposite side walls of the holder 4 and opposite side walls of the cartridge 6. Accordingly, in inserting the cartridge 6 into the holder 4, the disk 60 will laterally shift by only the clearance F even if the chassis 5 is shaky. Thus the disk 60 will backlash only in corresponding relation with the clearance F. This renders the disk 60 easy to place on the turntable 7.

Since there is little or no clearance between opposite side walls of the holder 4 and the opposite side walls of the cartridge 6 as loaded therein, the outer periphery of the disk 60 is unlikely to come into contact with the side walls of the cartridge 6.

Before the holder 4 is closed via the first opened position and the second opened position, the upper door 1 comes into contact with the vertical plate 210, and the lower end of the first slope 14 is moved out of contact with the upper surface of the cartridge 6. since the upper door 1 is biased in the closing direction by a spring, the frictional force of the upper door 1 is not exerted on the cartridge 6. The cartridge 6 is therefore subjected only to the pressure load by the push lever 8, hence a reduced load on the cartridge 6 during insertion.

(Cartridge Ejecting Mechanism)

Figure 13:
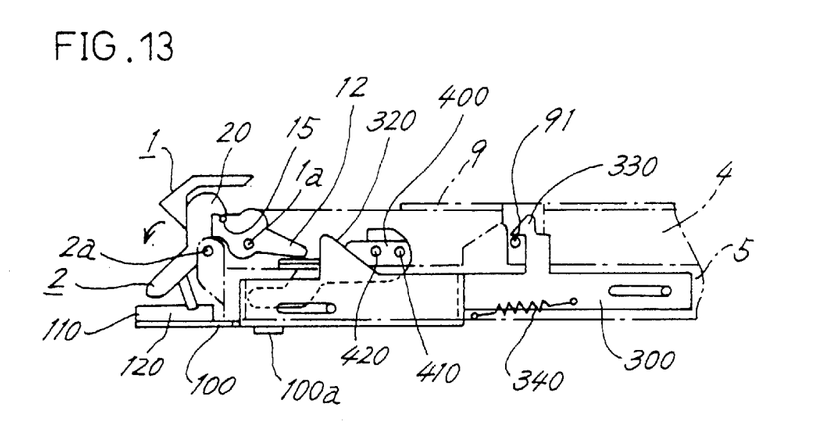
FIG. 13 is a side elevation showing components in the vicinity of a push-up lever.

FIG. 12 is a rear view of the frame 56 of the chassis 5, and FIG. 13 is a side elevation of the vicinity of the push-up lever 400. The ejecting lever 100 is pivoted to one end of the frame 56 as at 100a, positioned below the lower door 2 and biased counterclockwise by a spring (not shown). The ejecting lever 100 has an upward protuberance 110, which has a side face serving as a cam face 120 and positioned in the vicinity of the cam follower 23 projecting from the lower door 2.

Ejecting Movement

The ejecting lever 100 has one end providing a pushing projection 130 to be contacted with the driven plate 310 of the slide plate 300. When the ejecting lever 100 shown in FIG. 12 is turned clockwise (the direction X in FIG. 12) by hand, the pushing projection 130 pushes the driven plate 310, pushing the slide plate 300 forward against the force of the spring 340. The cam face 120 pushes the cam follower 23, moving the lower door 2 counterclockwise around the pivot 2a as shown in FIG. 13 to unlock the upper door 1 from the lower door 2.

Figure 14A:
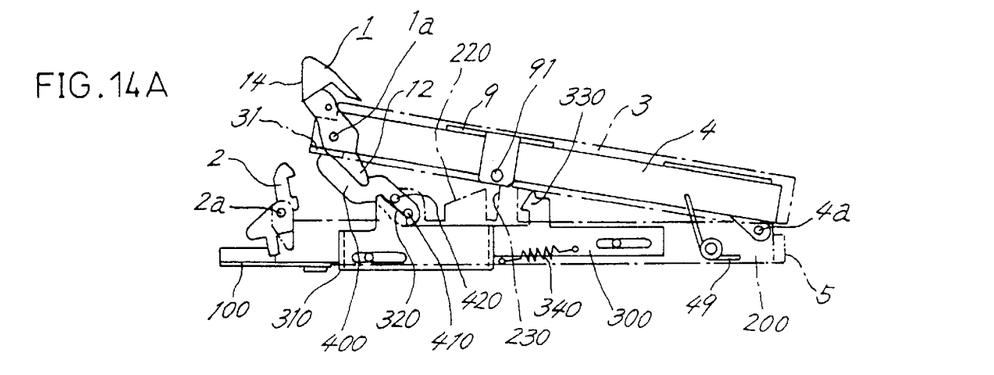
FIGS. 14A, 14B and 14C are side elevations showing an ejecting movement.
Figure 14B:
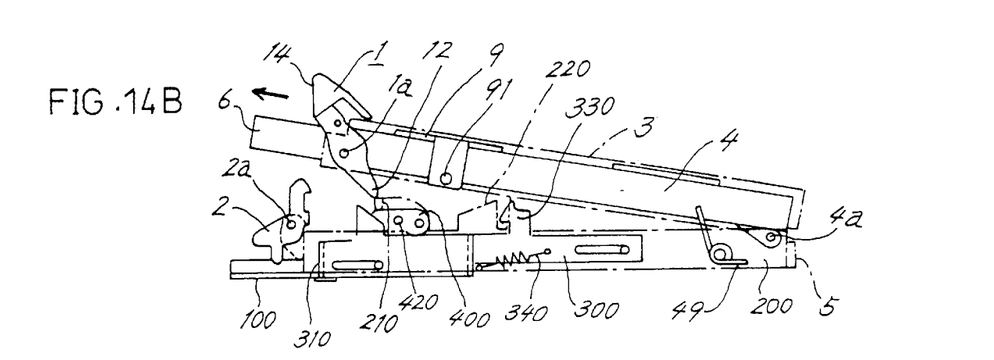
Figure 14C:
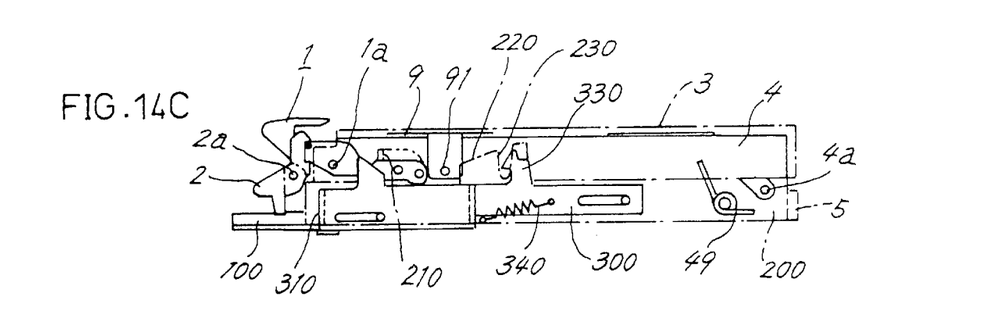

FIGS. 14A, 14B and 14C are side elevations showing the ejecting movement. The upper case 3 and the chassis 5 are indicated in chain lines. With reference to FIG. 14A, the advance of the slide plate 300 releases the hook 330 from the guide pin 91, permitting the rise of the holder 4.

The slanting edge 320 of the slide plate 300 pushes the pin 420 on the push-up lever 400, pivotally moving the lever 400 upward. The lever 400 kicks up the horizontal plate 31 of the upper case 3 with a free end thereof. Since the upper door 1 is unlocked from the lower door 2, the upper case 3 is movable about the pivot 4a. The upper case 3 moves upward against the torsion spring 49. The guide pin 91 is released from the guide groove 230.

With the guide pin 91 moved out of the guide groove 230, the slide piece 9 is allowed to slidingly move rearward. Since the push lever 8 is biased by the tension spring 86 (see FIG. 10B), the cartridge 6 and the slide piece 9 in engagement with the push lever 8 move rearward. The fitting pin 90 on the slide piece 9 shown in FIG. 10B moves out of the second slanting slit 85, moves through the circular-arc slit 84 and reaches the position shown in FIG. 9B, i.e., the second opened position of the holder 4. As seen in FIG. 11B, the guide pin 91 on the slide piece 9 comes into contact with the lift slope 220 of the support bracket 200. The upper door 1 is opened by the contact of the end of the kickout piece 12 with the vertical plate 210 to open the path of movement of the cartridge 6, which is partly discharged from the holder 4.

When released from the hand, the ejecting lever 100 returns to the original position, and the lower door 2 also returns as shown in FIG. 14B. The slide plate 300 is moved rearward by the spring 340, and the push-up lever 400 returns to the original position with the pin 420 released from the slide piece 9.

The slide piece 9 further retracts to the position shown in FIG. 9A. The guide pin 91 on the slide piece 9 moves rearward on the lift slope 220 of the support bracket 200, permitting the descent of the holder 4.

The cartridge 6 is removed form the holder 4 by hand. The holder 4 is moved down by the torsion spring 49. With the vertical plate 210 moved out of contact with the kickout piece 12 of the upper door 1, the upper door 1 pivotally moves to close the rear-end opening of the holder 4 as seen in FIG. 14C. The upper case 3 and the holder 4 descend, and the latch pin 15 of the upper door 1 comes into contact with the end of the lock pawl 20, temporarily moving the lower door 2 counterclockwise, but upon moving past the end of the lock pawl 20, the pin 15 comes into engagement with the lock pawl 20 as returned by the spring on the pivot 2a. The upper door 1 is locked, returning to the standby state.

Although the mechanism for opening and closing the shutter 63 of the cartridge 6 has been omitted from the foregoing description, this opening-closing mechanism is provided within the holder 4 and is already known.

INDUSTRIAL APPLICABILITY

The insertion of the cartridge 6 into the holder 4 turns the door 1 to expose the opening of the holder 4 and further causes the kickout piece 12 to lift the holder 4 against the force of the spring. When the cartridge 6 is further inserted and becomes released from the contact face, the contact face returns in such a direction as to close the opening. The holder 4 as lifted by the kickout piece 12 is released therefrom, allowed descend, and closed by the spring.

Thus, the holder 4 is opened in the initial stage of insertion of the cartridge 6, and the holder 4 is closed after the insertion. In this way, the cartridge 6 can be opposed to the turntable 7 on the chassis 5 by the single manual movement of inserting the cartridge 6. This renders the apparatus usable more conveniently than conventionally.

What is claimed is:

1. A device for accommodating a cartridge comprising a holder having an opening for inserting the cartridge therethrough with a disk enclosed in the cartridge, and a chassis supporting a base end of the holder by a pivot and having a turntable mounted thereon, the cartridge accommodating device being characterized in that the holder is provided with a spring at the base end thereof for biasing the holder in a closing direction, a door being pivoted to the holder at a free end thereof providing the opening, the door having a contact face positioned at a cartridge ejecting side of the pivot and inclined with respect to the direction of insertion of the cartridge, and a kickout piece positioned at a cartridge inserting side of the pivot and movable into contact with the chassis when the holder is raised, the door being biased by a second spring in a direction for the contact face to close the opening of the holder, the door being movable between an opened position in which the contact face is pushed by the cartridge to expose the opening of the holder when the cartridge is inserted, and the kickout piece pushes the chassis to lift the holder against the biasing force of the spring and a closed position in which the contact face returns in a direction to close the opening after the contact face is released from the cartridge as the cartridge is further inserted to permit descent of the holder.

2. A cartridge accommodating device according to claim 1 wherein the chassis is provided with a positioning pin fittable in a rear end portion of the cartridge, and the holder causes a lower surface of the cartridge to be positioned above the positioning pin when the door is in the opened position.

3. A cartridge accommodating device according to claim 1 wherein a slide piece pushable by the cartridge is provided on the holder and movable in the directions of insertion and ejection of the cartridge, and the chassis being provided with a lift member engageable with the slide piece for raising the holder with the movement of the slide piece in the cartridge inserting direction, and a lower surface of the cartridge is positioned above the turntable when the holder is in an opened position in which the slide piece is in engagement with the lift member.

4. A cartridge accommodating device according to claim 1 wherein the chassis is provided with a friction reducing mechanism adapted to contact the kickout piece when the holder is in an opened position with the door held in its opened position to further open the door and move the contact face away from an upper surface of the cartridge.

5. A cartridge accommodating device according to claim 4 wherein the friction reducing mechanism comprises a vertical plate projecting from the chassis and movable into the path of pivotal movement of the kickout piece to open the door against the biasing force of the second spring.

* * * * *